United States Patent [19]
Ingemi

[11] Patent Number: 5,438,498
[45] Date of Patent: Aug. 1, 1995

[54] SERIES RESONANT CONVERTER HAVING A RESONANT SNUBBER

[75] Inventor: Michael J. Ingemi, Norwood, Mass.

[73] Assignee: Raytheon Company, Lexington, Mass.

[21] Appl. No.: 171,294

[22] Filed: Dec. 21, 1993

[51] Int. Cl.⁶ .......................................... H02M 3/335
[52] U.S. Cl. ...................................... 363/17; 363/132
[58] Field of Search ..................... 363/16, 17, 55, 56, 363/97, 98, 131, 132

[56] References Cited

U.S. PATENT DOCUMENTS

| | | | |
|---|---|---|---|
| 4,017,784 | 4/1977 | Simmons et al. | 321/2 |
| 4,691,270 | 9/1987 | Pruitt | 363/132 |
| 4,691,273 | 9/1987 | Kuwata et al. | 363/132 |
| 4,855,888 | 8/1989 | Henze et al. | 363/17 |
| 4,876,635 | 10/1989 | Park et al. | 363/17 |
| 5,014,176 | 5/1991 | Kelleher et al. | 363/26 |
| 5,075,836 | 12/1991 | Suzuki et al. | 363/17 |
| 5,157,593 | 10/1992 | Jain | 363/17 |
| 5,278,748 | 1/1994 | Kitajima | 363/56 |

OTHER PUBLICATIONS

"Resonant Mode Converter Topologies—Additional Topics," Bob Mammano, Unitrode Regulated Power Supply Design Seminar Manual, Copyright 1990 Unitrode Corporation, pp. 6-1 to 6-6.

"Series Resonant Converter With Clamped Tank Capacitor Voltage," B. S. Jacobson and R. A. Diperna, Raytheon Company, 1990 IEEE, pp. 137-146.

Primary Examiner—Steven L. Stephan
Assistant Examiner—Matthew V. Nguyen
Attorney, Agent, or Firm—Walter F. Dawson

[57] ABSTRACT

A fixed frequency, series resonant converter having a resonant snubber comprising an inductor and capacitor connected across a tank circuit of the converter. An optimum amount of inductance in the resonant snubber minimizes the degree of "shoot-thru," or conduction through a body-diode within a transistor switch of the converter caused by ringing, which allows for nearly sinusoidal current to be provided to a full bridge high voltage rectifier enabling the power converter to operate at a higher frequency. An alternate embodiment applies the resonant snubber only across a selected transistor switch.

11 Claims, 5 Drawing Sheets

SERIES RESONANT CONVERTER HAVING A RESONANT SNUBBER

The Government has rights in this invention pursuant to Contract No. N00014-92-C-2014 awarded by the Department of the Navy.

BACKGROUND OF THE INVENTION

This invention relates generally to power conversion and, more particularly, to a series resonant converter which includes an L-C circuit in parallel with a tank circuit of the converter to prevent current from flowing in body diodes of the power transistors.

In recent years, resonant converters have attracted increased attention due, in part, to their high efficiency, low switching losses, low levels of electromagnetic interference (EMI), the ability to optimize the design of filters and magnetic components at a specific frequency, and their conduciveness toward miniaturization.

Figure 1:
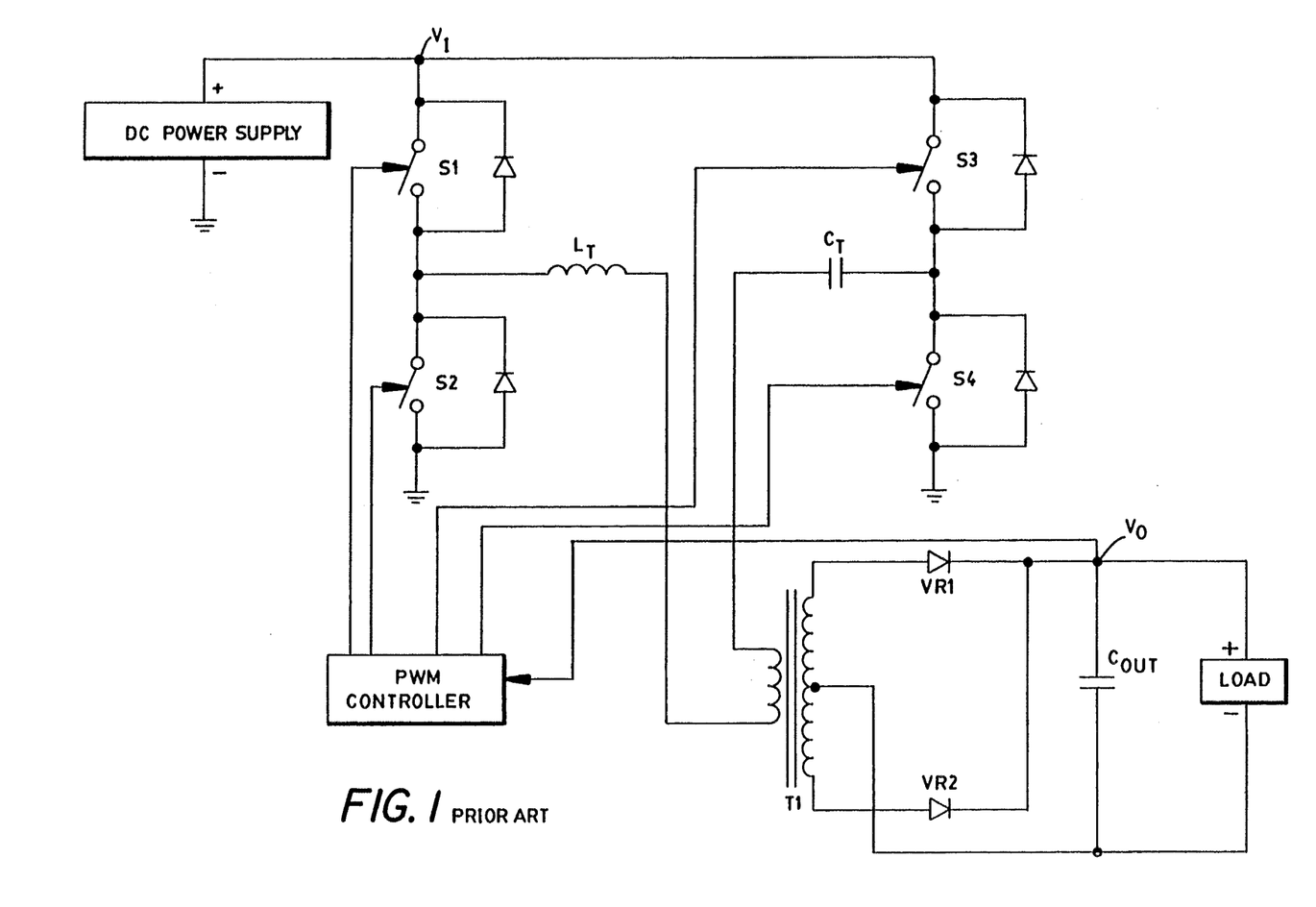
FIG. 1 illustrates a series resonant converter according to the prior art.

One fixed-frequency regulation method is pulse width modulation (PWM) of the resonant tank voltage; this method is also known as phase shift pulse width modulation (PWM), and a converter using this method may also be called a clamped-mode resonant converter. One such prior art resonant converter with PWM is shown in FIG. 1. Switches S1 and S2 are switched alternately with a fifty percent duty cycle, and switches S3 and S4 are similarly switched. In order to achieve PWM control of the resonant tank voltage, turn-ON of S4 is delayed with respect to the turn-ON of S1 by a phase angle which is dependent on the current requirements of the load. Turn-ON of S3 is similarly delayed with respect to the turn-ON of S2.

Switching type regulating devices used in power converters utilize semiconductor devices for the switching devices, such as metal-oxide semiconductor field effect transistors (MOSFETs). These devices are turned-ON or saturated of turned-OFF during operation. When the MOSFETs are turned-ON fully, the semiconductor devices are conducting and little or no power is dissipated. Also, when nonconducting or fully OFF, no power is dissipated. However, power is dissipated in such a semiconductor device during the time interval of switching from a nonconducting condition to a conducting condition and vice versa. It is during the transition or switching time interval that a substantial amount of power may be dissipated in such a semiconductor device, and if large enough such power may severely damage the semiconductor device.

In order to maintain low switching losses, this circuit must be operated in a discontinuous conduction mode. However, with a converter design that requires high voltage outputs, continuous conduction is preferred. The antiparallel diodes shunting the switches are forced to turn-OFF while the current still flows, and because of their relatively long recovery times, considerable turn-ON losses are produced in the switches.

This condition of turn-ON losses can result in a failure if power MOSFETs are used as switches and their integral body diodes serve as the antiparallel diodes. If for example, S1 turns-ON when the antiparallel diode shunting S2 still conducts, a "shoot-thru" current occurs and a potentially destructive dv/dt can develop across S2. If the failure does not occur, the turn-ON losses or extra power dissipation become excessive due to long recovery time of the MOSFET's integral body diodes and prevent the converter from operating at higher frequencies. If reduced physical size of a converter is important, then operating at a higher frequency becomes a requirement.

Even with high speed blocking and antiparallel diodes connected to all switches in order to eliminate the "shoot-thru" condition, large voltages and currents can be developed by the resonant tank during an overload. A fast current foldback or shutdown protection is required in order to prevent catastrophic failure of the converter under the short circuit condition.

SUMMARY OF THE INVENTION

Accordingly, it is therefore an object of this invention to provide a power converter with a resonant snubber to prevent current from flowing in a body diode of a power transistor.

It is another object of this invention to provide a power converter operating at a higher frequency to reduce the physical size of the converter.

It is a further object of this invention to provide a nearly sinusoidal signal to a full bridge rectifier of the converter.

It is a further object of this invention to provide a power converter having a source current to discharge a parasitic body capacitor of the power switching transistor in order to have lower switching losses in the transistor.

The objects are further accomplished by providing in a power conversion circuit including a series resonant circuit coupled between the junctures of two pairs of series-connected switching devices, means coupled in parallel with the resonant circuit for providing a source current to the switching devices. Each of the switching devices comprises an anti-parallel diode shunting a corresponding one of the switching devices, the anti-parallel diode being poled to conduct current in opposition to current through the corresponding one of the switching devices. The source current prevents the anti-parallel diode from conducting by canceling out a current generated in the anti-parallel diode. Each of the switching devices comprises a parasitic capacitor shunting a corresponding one of the switching devices, the capacitor being discharged by the source current during transition time to lower switching losses in the switching devices when the switching devices are being turned-ON and turned-OFF.

The objects are further accomplished by a power converter comprising a power source, four switching devices arranged as two switching pairs, each of the pairs comprising two series-connected switching devices, each of the two switching pairs being coupled across the power source, each of the switching devices including means for actuating the switching devices between ON and OFF states, each of the switching devices comprises an anti-parallel diode shunting corresponding ones of the switching devices, the anti-parallel diode being poled to conduct current in opposition to the current through the corresponding switching device from the power source, controller means coupled to the four switching devices for providing control signals individually to the actuating means, a resonant circuit including inductive elements and a capacitive element in series, the resonant circuit being coupled between the juncture of the two series-connected switching devices of a first of the two switching pairs and the juncture of the two series-connected switching devices of the other of the two switching pairs, a transformer having primary and secondary windings, the primary windings being coupled in series with the resonant circuit such that current through the resonant circuit impresses a voltage across the primary windings, means coupled to the resonant circuit for constraining the voltage on the resonant circuit to within a predetermined value, means connected in parallel with the resonant circuit for providing a source current to the switching devices, and rectifier means coupled to the secondary winding of the transformer for generating a predetermined output voltage. The switching means comprises MOSFET devices. The inductive elements of the resonant circuit comprise a first inductor in series with a first split primary winding of the transformer and a second inductor in series with a second split primary winding of the transformer, and a capacitor coupled intermediate the first split primary winding and the second split primary winding of the transformer. The transformer comprises a secondary winding having a sinusoidal current in accordance with the tuning of the resonant circuit. The source current means comprises an inductor in series with a capacitor. The source current prevents the anti-parallel diodes from conducting by canceling out a current generated in the anti-parallel diodes. Each of the MOSFET devices comprises a parasitic capacitor coupled between source and drain, the capacitor being discharged by the source current during transition time when the switching devices are being turned-ON and turned-OFF.

The objects are further accomplished by providing in a phase-shifted, pulse width modulated, bridge power converter, means coupled to a juncture of switching devices and shunting one of the switching devices of the power converter bridge for providing a source current to the switching devices. Each of the switching devices of the power converter bridge comprises an anti-parallel diode shunting a corresponding one of the switching devices, the anti-parallel diode being poled to conduct current in opposition to current through the switching devices. The source current prevents the anti-parallel diode from conducting by canceling out a current generated in the anti-parallel diode. Each of the switching devices of the power converter bridge comprises a parasitic capacitor shunting a corresponding one of the switching devices, the capacitor being discharged by the source current during transition time to lower switching losses in the switching devices when the switching device is being turned-ON and turned-OFF.

The objects are further accomplished by a method of providing a power conversion circuit having a series resonant circuit coupled between the junctures of two pairs of series-connected switching devices comprising the step of coupling means in parallel with the resonant circuit for providing a source current to the switching devices. The step of coupling source current means in parallel with the resonant circuit comprises the step of canceling out a current generated in an anti-parallel diode shunting a corresponding one of the switching devices preventing the anti-parallel diodes from conducting. The step of coupling source current means in parallel with the resonant circuit comprises the step of the source current discharging a capacitor shunting a corresponding one of the switching devices during transition time to lower switching losses in the switching devices when the switching devices are being turned-ON and turned-OFF.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Referring to FIG. 1, there is shown a circuit diagram of a series resonant DC power converter 10 according to the prior art, which power converter 10 was alluded to in the background statement. The prior art power converter of FIG. 1 includes two pairs of two series-connected switching devices S1, S2 and S3, S4 coupled between a DC power supply and ground. Each of the switching devices, which typically are transistors or other semiconductor devices, is shunted by an antiparallel diode poled in opposition to the current flow between the DC power supply and ground. Coupled between the junctures of the pairs of switching devices there is a series-connected tank circuit including an inductor $L_T$, a capacitor $C_T$ and the primary winding of a power transformer T. In this illustrative prior art circuit, the secondary winding of the power transformer T is center-tapped, and a pair of diodes VR1, VR2, and a filter capacitor $C_{out}$ form a full wave-rectified DC output signal to be applied to a load circuit. The inductance ($L_T$) and capacitance ($C_T$) of the tank circuit are selected to provide the desired resonant frequency of the converter 10 and characteristic impedance to be related to the impedance of the load circuit according to a preselected ratio.

Figure 2:
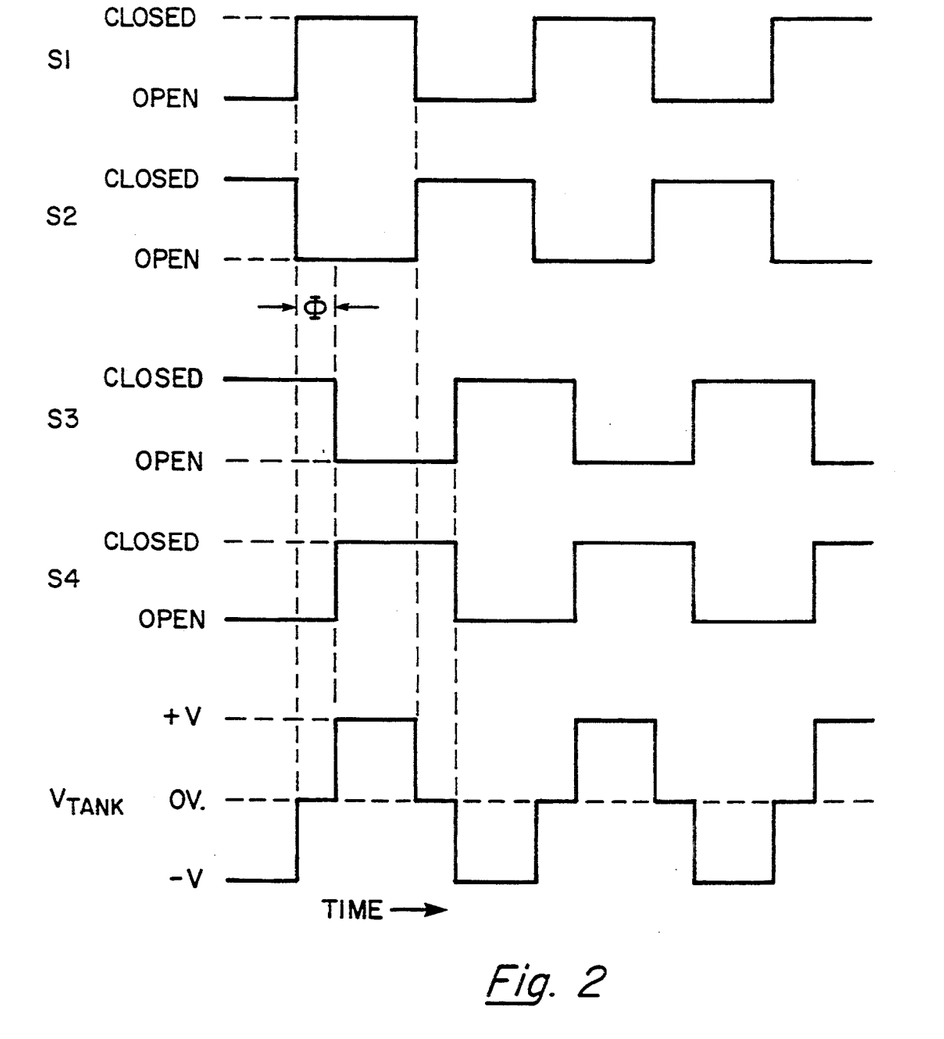
FIG. 2 is a series of waveforms useful in understanding the operation of the series resonant converter in FIG. 1.

Referring also to FIG. 2, there is shown a series of timing waveforms useful in understanding pulse width modulation (PWM) control of the output voltage of the prior art DC power converter 10 illustrated in FIG. 1. The PWM controller of FIG. 1 causes actuation of the switching devices S1 through S4 in accordance with the waveforms of FIG. 2. All of the switching devices are alternately opened (OFF) and closed (ON) for equal time duration, and, as may be observed from FIG. 2, the states of each device of the pairs S1, S2 and S3, S4 are complementary; that is, S1 is closed (ON) while S2 is open (OFF) and open (OFF) while S2 is closed (ON), and S3 is closed (ON) while S4 is open (OFF) and open (OFF) while S4 is closed (ON).

From the circuit diagram of FIG. 1, it may be seen that while S1 and S4 are closed (S2 and S3 open), energy is transferred in a first direction through the elements of the series resonant circuit, and while S2 and S3 are closed (S1 and S4 open), energy is transferred in the other direction through the resonant circuit. Thus, if the switching device pairs are actuated simultaneously, i.e., in phase, energy is continually being transferred from the DC power supply into the resonant circuit. However, if the phasing of the actuation of the pair S3, S4 shifts with respect to the actuation of the pair S1, S2, there will be periods of time when S1 and S3 are both shorted and the resonant circuit will have equal potential at both ends and hence no voltage will be applied to it. Furthermore, when S1 and S3 are both open, the resonant circuit will be entirely decoupled from the DC power supply and no current will flow. Thus, it is seen that the phasing of the actuation of the pairs S1, S2 and S3, S4 controls the total amount of energy from the DC power supply transferred to the resonant circuit. In particular, the maximum amount of energy is transferred when S1 and S4 are opened and closed simultaneously and S2 and S3 are opened and closed simultaneously, that is, the phase angle $\phi$ between the actuations of pairs S1, S2 and S3, S4 is zero. Decreased amounts of energy are transferred as the phase angle increases until $\phi = 180°$, at which time S1 and S3 operate together and S2 and S4 operate together and no energy is transferred from the power supply to the resonant circuit.

Figure 3:
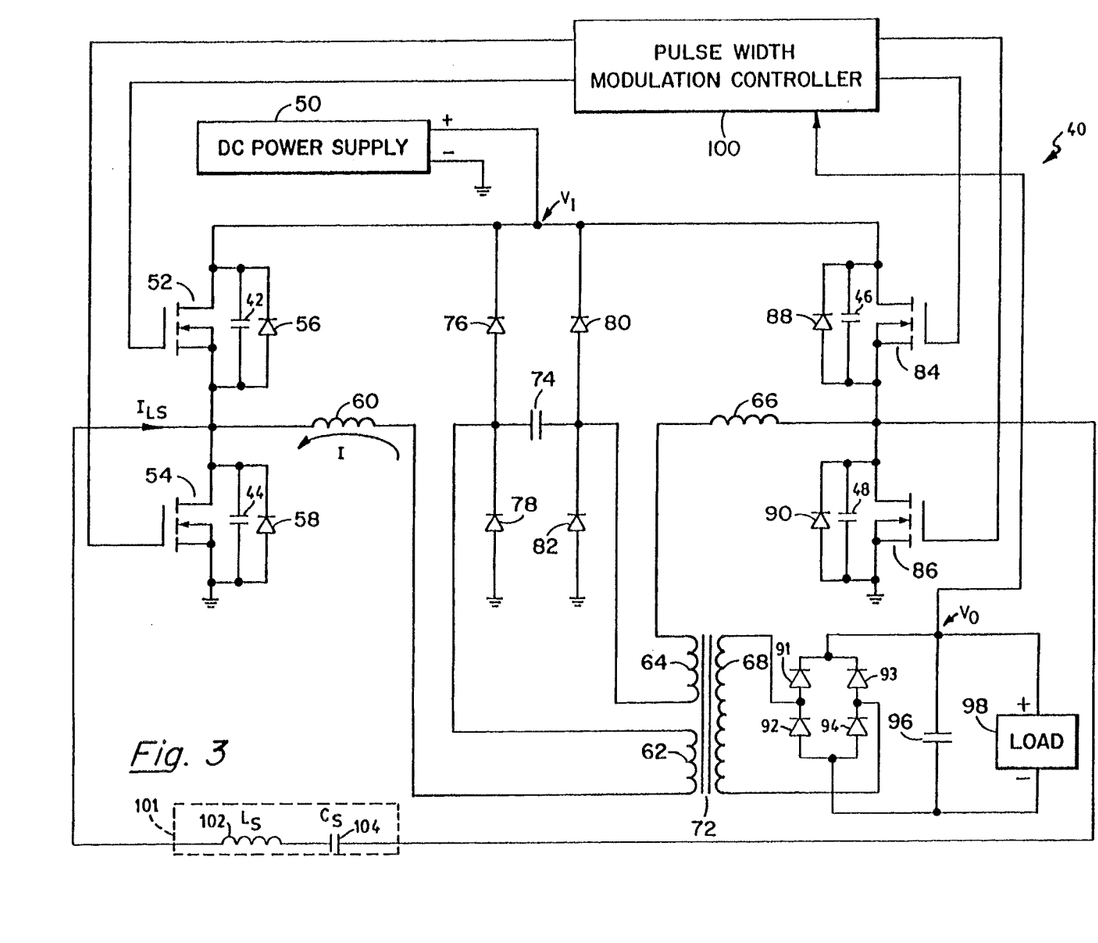
FIG. 3 illustrates a series resonant converter having a resonant snubber according to the principles of the present invention.

Referring now to FIG. 3, there is shown a circuit diagram of a power converter 40 having a resonant snubber 101 according to the preferred embodiment of the present invention; the resonant snubber 101 comprises an inductor ($L_S$) 102 in series with a capacitor ($C_S$) 104 having the other end of the inductor 102 connected to the juncture of switching devices 52 and 54, and the other end of the capacitor 104 connected to the juncture of switching devices 84 and 86. The power converter 40 includes four switching devices 52, 54, 84 and 86, shown as n-channel enhancement mode MOSFETs, which are series-connected by pairs 52, 54 and 84, 86 between a DC power supply 50 and ground. Coupled between the junctures of the switching device pairs 52, 54 and 84, 86 is a series resonant tank circuit including inductors 60 and 66, capacitor 74 and the split primary windings 62 and 64 of a power transformer 72. The output portion of the power converter 40 of the present invention, comprises a secondary winding 68 of transformer 72, full bridge rectifier diodes 91, 92, 93 and 94, and filter capacitor 96. Switching devices 52, 54, 84 and 86 are shunted by antiparallel diodes 56, 58, 88 and 90, respectively, and the control terminals of switching devices 52, 54, 84 and 86 are driven by PWM controller 100. Capacitors 42, 44, 46 and 48 represent the parasitic capacitance between the source to drain terminals of the transistor switching diodes 52, 54, 84 and 86 respectively. Diodes 76, 78, 80 and 82 form a voltage clamp about either side of capacitor 74 between the supply voltage ($V_I$) and ground.

In the preferred embodiment, presented herein by way of example, there is disclosed a 300 watt DC power converter capable of converting input DC power in the range of 250–350 volts, illustratively 270 volts, into a 53K ohm load, typically at 4,000 volts DC. In this embodiment, switching devices 52, 54, 84 and 86 are all n-channel enhancement mode metal-oxide semiconductor field-effect transistors (MOSFETs), which may be of a type similar to Model No. IRF 450, sold by International Rectifier, of El Segundo, Calif. These particular devices include intrinsic body diodes, shown in FIG. 3 as diodes 56, 58, 84 and 86, which function as antiparallel diodes to provide paths for current flow after the switching transitions.

Pulse width modulation controller 100 may illustratively be of the type used for that function in the prior art converter of FIG. 1. PWM controller 100 provides square wave control signals to the control terminals of switching devices 52, 54, 84 and 86, substantially in accordance with the timing scheme presented in FIG. 2, wherein the phase angle $\phi$ is varied to accommodate differing load requirement. The output voltage $V_o$ of power converter 40 is fed back to the PWM controller 100 for monitoring in order to control the phase angle $\phi$. Such a PWM controller 100 is known to one of ordinary skill in the art.

Relating the waveforms of FIG. 2 to the converter of FIG. 3, the S1 waveform corresponds to switching device 52, the S2 waveform corresponds to switching device 54, and S3 waveform corresponds to switching device 84 and the S4 waveform corresponds to switching device 86. The waveform represented as $V_{TANK}$ corresponds to the voltage across the resonant circuit, i.e., between the juncture of switching devices 52 and 54 and the juncture of switching devices 84 and 86. Switching devices 52 and 54 are alternately switched, under the control of PWM controller 100, with a 50 percent duty cycle. Switching devices 84 and 86 are similarly switched. In order to achieve pulse width modulation control of the voltage across the resonant circuit, the actuation of the pairs 84, 86 is delayed with respect to the actuation of the pairs 52, 54. The duty cycle of the resonant circuit voltage, $V_{TANK}$ of FIG. 2, increases with decreasing phase angle $\phi$; thus, modulation of the $\phi$ results in PWM of the resonant circuit voltage, and hence the power converter 40 output. The lower the value of $\phi$, the greater the current delivered to the load device 98.

Still referring to FIG. 3, power transformer 72 includes split primary windings 62 and 64 and an output which is actually made up of six secondary windings 68, and in the present embodiment, provides a turns ratio of 14.4:1. Diodes 91, 92, 93 and 94 are coupled to the secondary winding 68 to form a full bridge high voltage rectifier, and filter capacitor 96 removes most of the ripple from the rectified signal so that a substantially DC output voltage (4,000 volts) is applied across load device 98. In the present device, for the parameters specified, capacitor 96 has an effective capacitance value of 30 nano-farads. The rectifier diodes 91, 92, 93 and 94 may be embodied by Part No. SEN 2127, manufactured by Sensitron of Deer Park, N.Y. The transformer 72 may be embodied by Model No. G595556-1, manufactured by Raytheon Company of Waltham, Mass.

The series resonant circuit of the power converter 40 of FIG. 3 includes capacitor 74 intermediate inductors 60 and 66, which comprise the resonant elements of the circuit. Also coupled in series with the resonant elements are windings 62 and 64, which comprise the split primary of transformer 72. Diodes 76 and 80 are coupled between either side of capacitor 74 and the high voltage output terminal for DC power supply 50, and are poled to conduct current away from capacitor 74 toward power supply 50. Diodes 78 and 82 are coupled between either side of capacitor 74 and ground, and are poled to conduct current toward capacitor 74 from the ground potential. In the embodiment shown in FIG. 3, capacitor 74 has a capacitance value of 10 nano-farads and each of the inductors 60 and 66 has an inductance value of 20μhenries. The inductors 60 and 66 may be embodied by Part No. 117-32350-000 manufactured by Electronic Coils, of Westford, Mass. PWM controller 100 drives the resonant circuit, via switching devices 52, 54, 84 and 86, at an illustrative frequency of 330 KHz.

Diodes 76, 78, 80 and 82 act as energy recovery diodes, clamping the voltage on the resonant circuit to within the voltage of power supply 50. In the converter as shown in FIG. 1, without energy recovery diodes, voltages and currents within the resonant circuit increase to unacceptable levels during overload conditions. With the presence of diodes 76, 78, 80 and 82, the voltage on capacitor 74 cannot exceed the magnitude of the input voltage provided from power supply 50. Thus, under overload conditions excess energy is returned to the input.

Additionally, in the prior art converter of FIG. 1, without energy recovery diodes, the resonant circuit current becomes continuous at full load and overload, thereby causing excessive dissipation in switches S1 through S4. In the power converter 40 of the present invention including diodes 76, 78, 80 and 82, no excess dissipation occurs during continuous conduction because conduction of any switch is always preceded by conduction in its corresponding antiparallel diode and not the opposite diode in the bridge. Further, the diode in conduction is naturally commutated by the load; thus, fast recovery diodes are not required as diodes 76, 78, 80 and 82.

Figure 4:
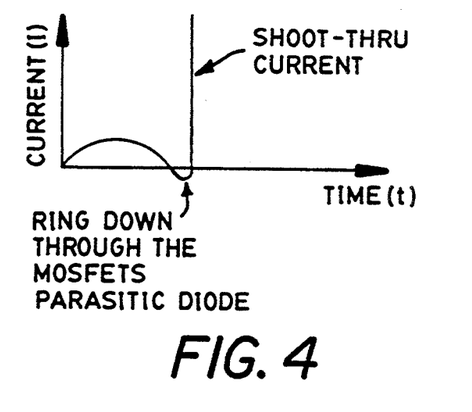
FIG. 4 is a graph showing the ring-down through the parasitic diode of a MOSFET power transistor and the resulting short-thru current.

Referring now to FIG. 3 and FIG. 4, the resonant snubber 101 comprising the inductor ($L_S$) 102 and capacitor ($C_S$) 104 are connected in parallel with the series resonant tank circuit which includes inductors 60 and 66, capacitor 74 and the split primary windings 62 and 64 of transformer 72. The resonant snubber 101 acting as an AC current source prevents the parasitic body diodes 56, 58, 88 and 90 of MOSFETS 52, 54, 84 and 86 from conducting, thereby preventing the negative ring-down effect of the current through the MOSFETS' parasitic diode as shown in FIG. 4. If such current ring-down occurs, for example, by a negative ring on current through inductor 60 turning-ON both opposing MOSFETS 52 and 54, then a shoot-thru current would be generated causing high dissipation in such MOSFETS 52 and 54. The resonant snubber 101 provides a source current ($I_{LS}$) to off-set the negative ring on such current and preventing the body diodes 56, 58, 8 and 90 from turning-ON. The resonant snubber 101 also provides current to discharge the parasitic capacitors 42, 44, 46, 48 of each MOSFET switching device. The parasitic capacitor 42 will be charged to $V_I$ when the power MOSFET switch 54 is ON. When the power MOSFET switch 54 is turned-OFF, the $I_{LS}$ current adds vectorily with the current flowing in the resonant inductor 60. In the event of conduction in the body diode 58, the current flows in the diodes 58 direction as that shown in FIG. 3. The vector sum of the two currents results in a net current which will flow through capacitor 42 discharging it. The voltage across 52 will then be near zero or −0.6 V. The power MOSFET can then be turned-ON with very low losses in such switches. The resonant snubber 101 allows the resonant LC tank circuit to remain unchanged and operation to be nearly continuous. This will also allow the current in the output diodes 91 through 94 to be nearly sinusoidal and thereby eliminate reverse recovery power in such output diodes. In the resonant snubber 101 shown in FIG. 3, the inductor 102 has an inductance value of 250μhenries and the capacitor 104 has a capacitance value of 10 nano-farads.

Figure 5:
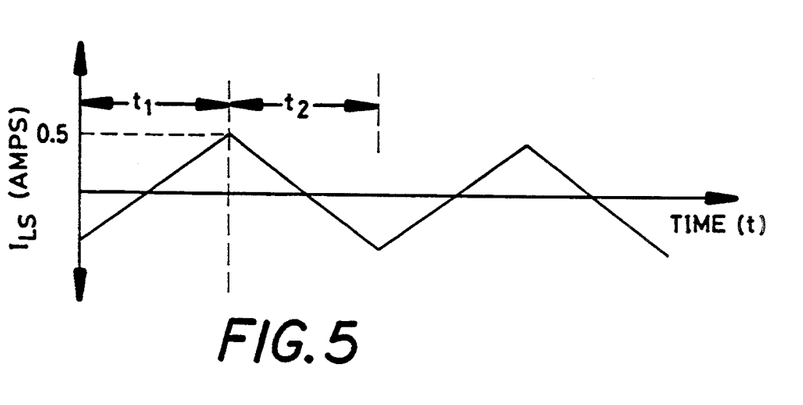
FIG. 5 is a graph showing the source current ($I_{LS}$) ramping up to 0.5 amps during a time period, $t_1$.
Figure 6:
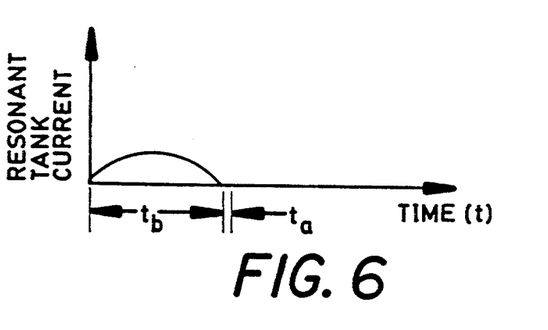
FIG. 6 is a graph showing the resonant tank current during time period $t_1$ in FIG. 5 where $t_a + t_b = t_1$.

Referring now to FIG. 3, FIG. 5, and FIG. 6, the AC source current ($I_{LS}$) from the resonant snubber 101 is shown in FIG. 5 as a function of time. During the time interval $t_1$, when MOSFET switching devices 54 and 84 are ON, the source current ($I_{LS}$) from the resonant snubber 101 ramps up to 0.5 amps. During time interval $t_2$, when MOSFET switching devices 52 and 86 are ON, the source current ($I_{LS}$) ramps down. In FIG. 6 the resonant tank current is plotted against time (t). Time interval $t_a$ represents the conduction time when two switching devices are ON. Time interval $t_b$ represents the time for the source current ($I_{LS}$) ramp-up in the resonant snubber 101. Time interval $t_1$ in FIG. 5 equals the sum of $t_a + t_b$. During time interval $t_a$ without a resonant snubber 101 the tank current would ordinarily ring negative through one of the parasitic body diodes, but instead the tank current is vector summed with the snubber 101 source current $I_{LS}$. In addition, when switching device 54 is turned-OFF, the remaining current in $L_S$ 102 flows through the parasitic body capacitor 42 causing it to discharge from $V_I$ to zero. This discharge occurs during the transition time before switching device 52 is turned-ON, but after switching device 54 is turned-OFF. Switching device 52 is now able to be turned-ON with zero to 0.6 volts. The higher the inductance of $L_S$ 102 (250 μh), the less source current ramping-up and the less source current available to discharge the power MOSFET switching devices 52, 54, 84 and 86. As the input voltage $V_I$ rises, more current flows through $L_S$ 102 (V/L=dI/dt) and efficiency rises.

Figure 7:
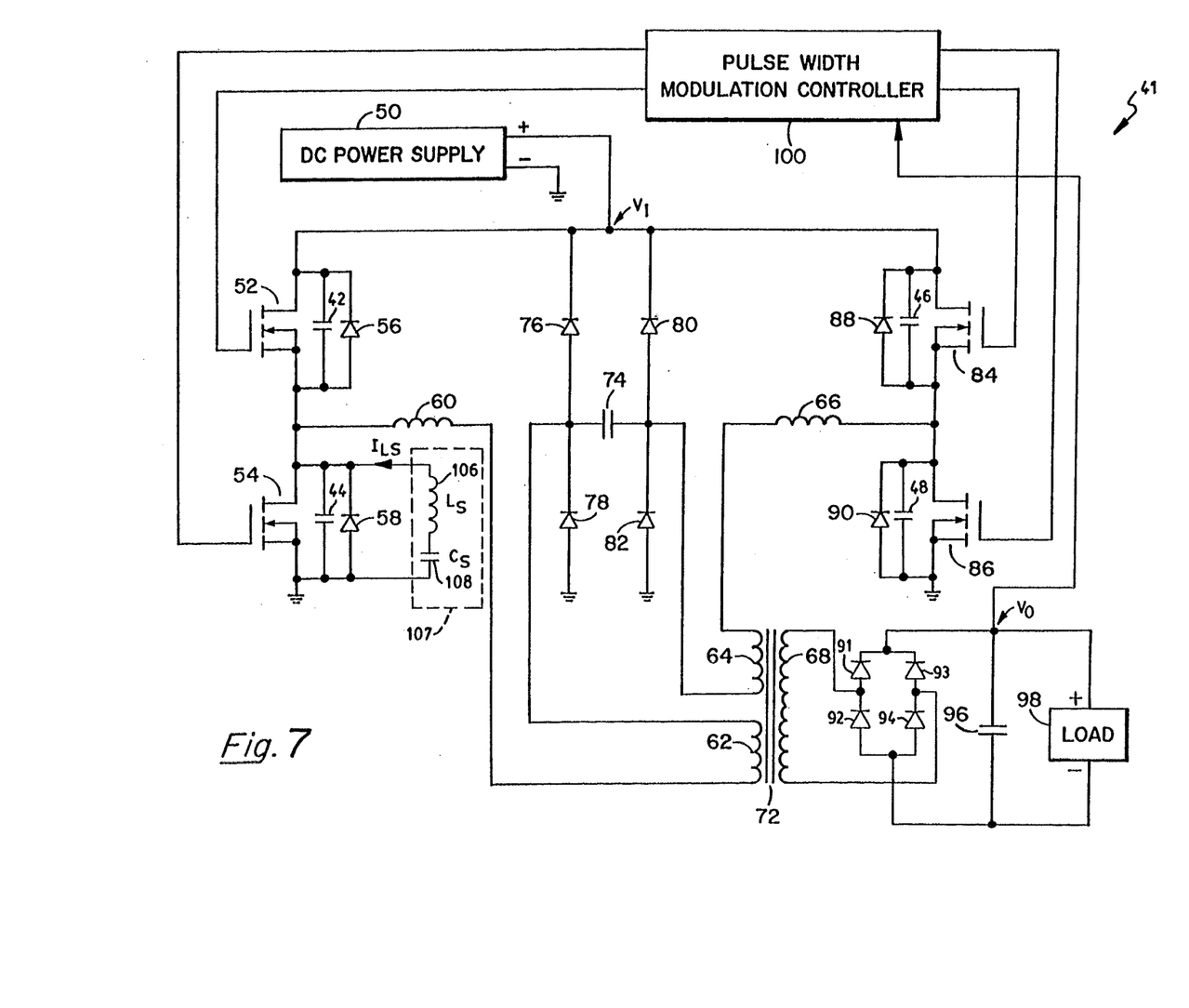
FIG. 7 shows an alternate embodiment of a series resonant converter having a resonant snubber across one of the power transistors.

Referring now to FIG. 7, an alternate embodiment of a series resonant converter 41 is shown which is similar to the power converter 40 in FIG. 3 except for having a series resonant snubber 107 connected across one of the power MOSFET switching devices 54. It may appear obvious to one skilled in the art that the resonant snubber 107 comprising inductor 106 (250 μh) and capacitor 108 (10 nano-farads) may be connected across any one of the power MOSFET switching devices depending on which half of the resonant circuit has the ring-down problem. The current in $L_S$ will not vary due to phase angle $\phi$ of the switching devices 52, 54, 84 and 86 and it will only vary due to line changes. However, the resonant snubber 107 is preferred across the switching device 54 because of the non-symmetrical nature of series resonant converter 41 resulting from the clamping or energy recovery diodes 76, 78, 80 and 82 network. The lagging ($\phi$) pair of switching devices 84, 86 in a high voltage converter 41 need the snubbing action (or a current source) which is accomplished by placing the snubber 107 across the switching device 54 in an opposite side of the power converter bridge. The capacitance in the secondary of transformer 72 of a high voltage converter 41 gets multiplied and reflected into the primary which would result in a leading power factor situation without the use of the snubber 107.

This concludes the description of the preferred embodiment. However, many modifications and alterations will be obvious to one of ordinary skill in the art without departing from the spirit and scope of the inventive concept. Therefore, it is intended that the scope of this invention be limited only by the appended claims.

What is claimed is:

1. A power converter comprising:
   a power source;
   four switching devices arranged as two switching pairs, each of said pairs comprising two series-connected switching devices, each of said two switching pairs being coupled across said power source, each of said switching devices including means for actuating said switching devices between ON and OFF states;
   each of said switching devices comprises an anti-parallel diode shunting corresponding ones of said switching devices, said anti-parallel diode being poled to conduct current in opposition to the current through said corresponding switching device from said power source;
   controller means coupled to said four switching devices for providing control signals individually to said actuating means;
   a resonant circuit including inductive elements and a capacitive element in series, said resonant circuit being coupled between a juncture of the two series-connected switching devices of a first of said two switching pairs and a juncture of the two series-connected switching devices of the other of said two switching pairs;
   a transformer having primary and secondary windings, said primary windings being coupled in series with said resonant circuit such that current through said resonant circuit impresses a voltage across said primary windings;
   means coupled to said resonant circuit for constraining the voltage on said resonant circuit to within a predetermined value;
   means connected in parallel with at least one of said switching devices for providing a source current to said one of said switching devices; and
   rectifier means coupled to said secondary winding of said transformer for generating a predetermined output voltage.

2. The power converter as recited in claim 1 wherein said switching means comprises MOSFET devices.

3. The power converter as recited in claim 1 wherein said inductive elements of said resonant circuit comprise a first inductor in series with a first split primary winding of said transformer and a second inductor in series with a second split primary winding of said transformer; and
   a capacitor coupled intermediate said first split primary winding and said second split primary winding of said transformer.

4. The power converter as recited in claim 3 wherein said transformer comprises a secondary winding having a sinusoidal current in accordance with the tuning of said resonant circuit.

5. The power converter as recited in claim 1 wherein said control signals provided by said controller means comprise a first pair of fixed frequency signals opposite in phase and a second pair of fixed frequency signals opposite in phase, said second pair being phase shifted relative to said first pair in accordance with variations in an output voltage of said power converter.

6. The power converter as recited in claim 1 wherein said source current means comprises an inductor in series with a capacitor.

7. The power converter as recited in claim 1 wherein said source current prevents said anti-parallel diodes from conducting by canceling out a current generated in said anti-parallel diode.

8. The power converter as recited in claim 3 wherein each of said MOSFET devices comprises a parasitic capacitor coupled between source and drain, said capacitor being discharged by said source current during transition time when said switching devices are being turned-ON and turned-OFF.

9. The power converter as recited in claim 3 wherein said constraining means comprises means for enabling a first current flow from said capacitor toward a higher potential of the voltage output of said power source and a reference potential, and for enabling a second current flow toward said capacitor from a lower potential of the voltage output of said power source and said reference potential.

10. The power converter as recited in claim 9 wherein said constraining means comprises a pair of series-connected diodes coupled across said power source and coupled at the juncture of said pair of diodes to a terminal of said capacitor, said diodes of said pair being poled to enable said first and second current flows.

11. The power converter as recited in claim 9 wherein said constraining means further comprises a second pair of series-connected diodes coupled across said power source and coupled at the juncture of said second pair of diodes to the other terminal of said capacitor, said diodes of said second pair being poled to enable said first and second current flows.

* * * * *